Figure 4:
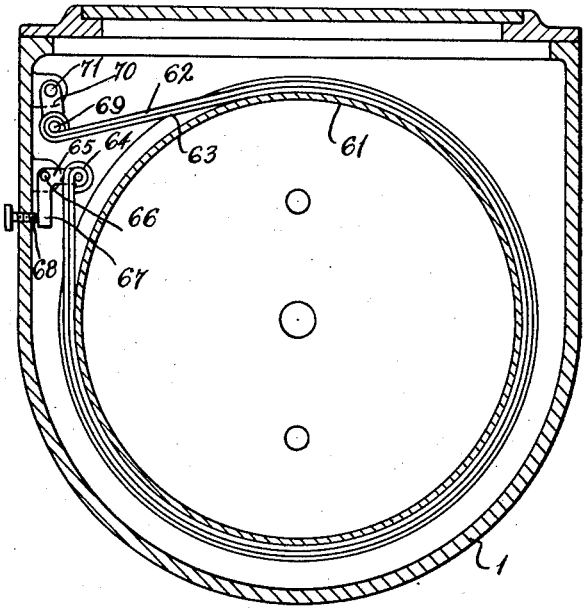

Dec. 3, 1935. T. F. RAINSFORD 2,022,689
AUTOMATIC REDUCTION GEAR
Filed Aug. 11, 1933 2 Sheets-Sheet 1
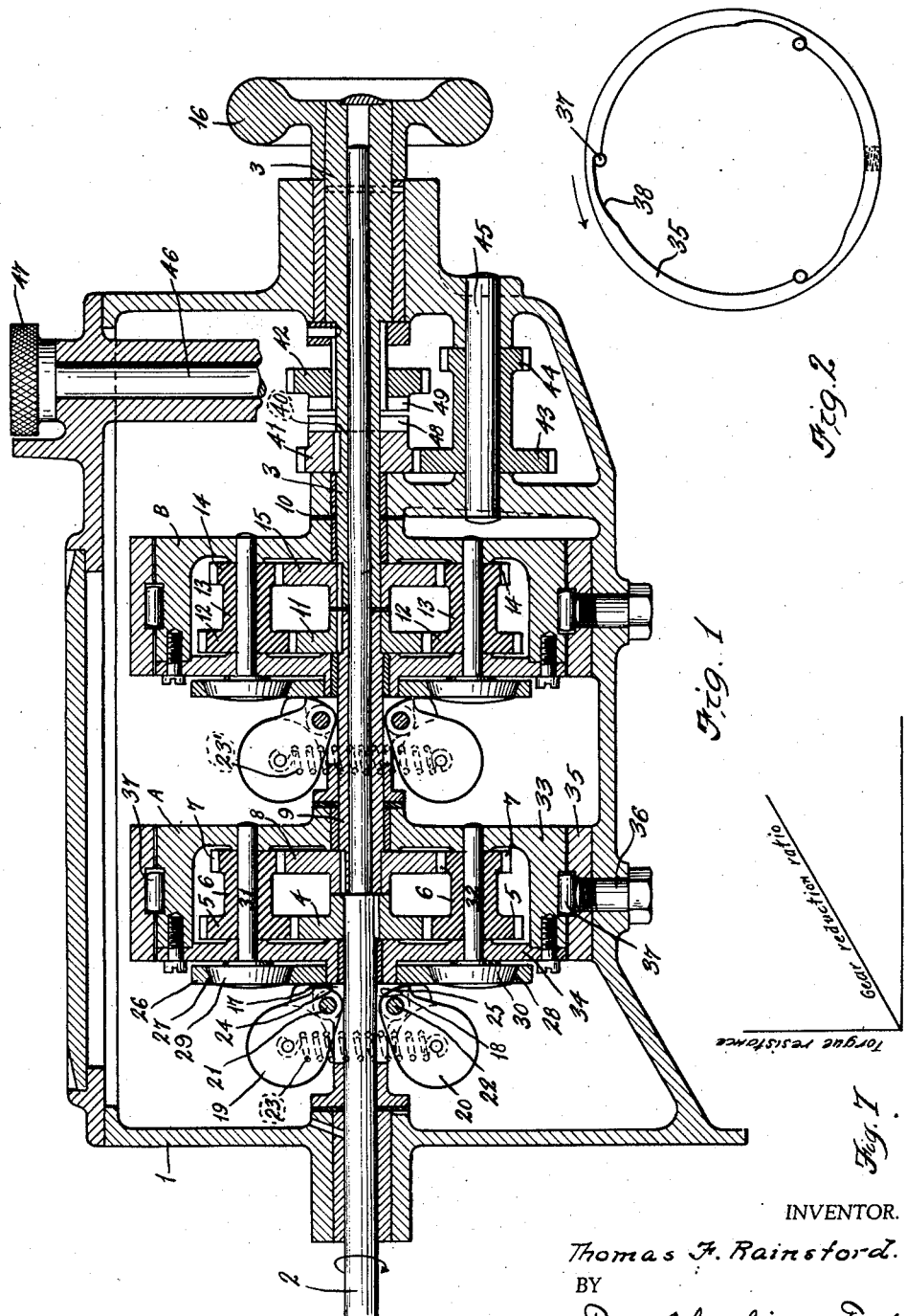
INVENTOR.
Thomas F. Rainsford.
BY
Fay, Oberlin + Fay
ATTORNEYS.

Dec. 3, 1935.   T. F. RAINSFORD   2,022,689
AUTOMATIC REDUCTION GEAR
Filed Aug. 11, 1933   2 Sheets-Sheet 2

INVENTOR.
Thomas F. Rainsford
BY
Fay, Oberlin & Fay
ATTORNEYS.

Patented Dec. 3, 1935

2,022,689

UNITED STATES PATENT OFFICE 2,022,689

AUTOMATIC REDUCTION GEAR

Thomas F. Rainsford, Cleveland, Ohio, assignor to The Automatic Gear Corporation, Cleveland, Ohio, a corporation of Ohio Application August 11, 1933, Serial No. 684,681

14 Claims. (Cl. 74—260)

The present invention relating, as indicated, to an automatic reduction gear has more particular reference to an automatic variable speed mechanism which is best adapted for installation between driving and driven elements in which the driving element is subjected to a relatively small starting torque and the driven element is subjected to a variable torque resistance. Salient examples of such mechanism in which such conditions exist are to be found in internal combustion engine vehicles such as automobiles, buses and trucks, in marine propeller shaft drives using both turbine and Diesel engine prime movers, and in rolling mill driving mechanisms and other heavy metal working machine drives.

One of the objects of the invention is to transmit a varying driving torque to a variable torque resistance through a gear reduction unit while maintaining a constant rate of change of the torque transmitted. That is to say, while the torque of the driving power is increasing to a point where it is equal or greater than the torque resistance of the driven element, the corresponding decrease in the mechanical advantage or gear reduction, through which such torque is transmitted, will be continuous and uniform and will not undergo such a decrease in steps or intermittently.

It is also an object of the invention to provide a power transmission drive in which the change in gear reduction is a function of or directly proportionate to the torque resistance on the driven element. In other words, the resistance of the load on the driven element will automatically determine the ratio of gear reduction from the power source.

A further object is to provide adjustable means by which the range of the change in gear reduction may be regulated at will, dependent upon the particular conditions to which the machine, in which my reduction gear is installed, is subjected. Further objects and advantages shall become manifest as the following description proceeds.

To the accomplishment of the foregoing and related ends, said invention, then, consists of the means hereinafter fully described and particularly pointed out in the claims, the annexed drawings and the following description setting forth in detail certain mechanism embodying the invention, such disclosed means constituting, however, but one of various mechanical forms in which the principle of the invention may be used.

In said annexed drawings:—

Figure 5:
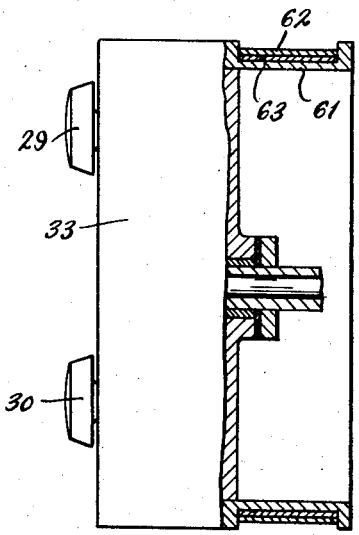
Figure 3:
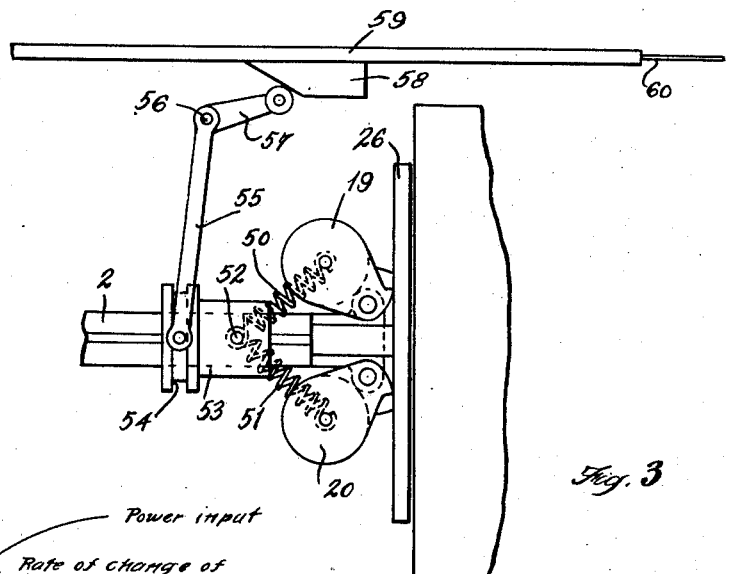
Figure 6:
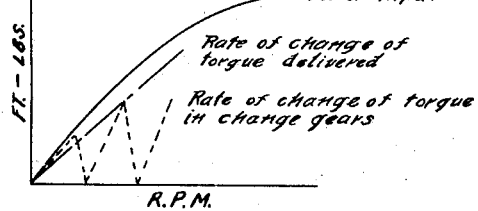

Fig. 1 is a vertical sectional view taken through an automatic reduction gear unit embodying the principle of my invention; Fig. 2 is a detail view of one of the epicyclic gear housing locking means; Fig. 3 is a detail view of the means for adjustably regulating the centrifugal movement of the governors; Fig. 4 is a transverse sectional view of a modified form of construction showing braking means for controlling the movement of the gear housing; Fig. 5 is another view of the device shown in Fig. 4 but taken upon a plane normal thereto; and Figs. 6 and 7 are diagrams illustrative of the functional operation of my invention.

Now, referring more particularly to Fig. 1, there is shown therein a main housing member indicated generally by the numeral 1, in each end of which are journaled the drive shaft 2 and the driven shaft 3. Between the drive shaft 2 and the driven shaft 3 are positioned the two compound epicyclic gear trains, referred to generally by the reference letters A and B, respectively. The inner end of the drive shaft 2 carries the gear 4, which in turn meshes with the planet gears 5. The planet gears 5 are mounted on a common shaft 6 with the smaller planet gears 7. The planet gears 7 in turn mesh with the driven gear 8. The driven gear 8 is fixed to the end of the intermediate stub shaft 9. The stub shaft 9 is in turn mounted upon a pilot shaft 10 which extends rearwardly through the assembly and also serves as an axial guide for the driven shaft 3. The right hand end of the shaft 9 in turn mounts the drive gear 11 in the planetary gear train B. In the same manner as previously described with respect to the gear train A, planet gears 12 and 14 mounted upon the common shaft 13 mesh with the driven gear 15. The driven gear 15 is fixed to the inner end of the drive shaft 3. The outer end of the drive shaft 3 carries a driven wheel 16, which may in actual installation assume the equivalent form of a universal joint, a coupling, a drive gear or a pulley.

Again referring to the gear train A, a pair of lateral projections 17 and 18 are mounted upon the drive shaft 2 at a point immediately in front of the gear train A. A pair of governors 19 and 20 are pivotally secured by means of the pins 21 and 22 to the projections 17 and 18. A tension spring 23 is joined to the centers of the governors 19 and 20 and serves as a means for retarding their centrifugal movement. On the inner end of the governors 19 and 20 and oppositely disposed to their pivot points are the small cam surfaces 24 and 25. These cam surfaces are adapted to bear against a flat plate 26 which in turn has the cone shaped apertures 27 and 28 for the reception of the brake wheels 29 and 30. As will be seen, the brake wheels 29 and 30 are respectively mounted on the ends of the shafts 31 and 32 which non-rotatably carry the planet gear shafts 6. The shafts 31 and 32 are journaled in a hollow annular gear housing composed of the flanged member 33 and cover plate 34. This last described housing serves as a means for covering the gears of the epicyclic gear train and also as a support for the axes of the planet gears 5 and 7. Another annular member 35 is secured to the frame 1 by means of the threaded stud 36 and surrounds the outer periphery of the housing member 33. A plurality of small rollers 37 are positioned in wedge shaped channels 38 between the outer periphery of the housing 33 and the inner periphery of the ring 35.

A construction identical to that last described follows throughout the assembly of the gear train B, and it is not thought necessary to reiterate an explanation of the specific parts. Suffice it to say, however, that the governors coacting with the gear train B are pivotally secured to projections which are carried by the shaft 9. The tension spring 23' which joints the governors in the gear train B possesses a relatively greater tensional force than that of the previous tension spring 23 for reasons which shall hereinafter become apparent.

A reversing gear unit may be installed on the end of the driven shaft 3. Since the construction of such reverse gears is well known to those skilled in the art, only a brief description thereof will be driven. The drive shaft 3 may be split at a point indicated by the dotted line 40. Gear 41 is mounted on the left-hand side of the split and gear 42 is splined to the drive shaft 3 on the right-hand side of the split. Gear 41 is adapted to mesh with gear 43 and gear 44 on the countershaft 45 meshes with another gear on a parallel axis and not shown, which latter gear in turn meshes with gear 42. An operating shaft 46 having the exterior manipulating knob 47 may then be connected to the sliding gear 42 by any suitable fork or yoke (not shown) in order that the latter might be shifted into and out of engagement with the gear in mesh with gear 44. Intermeshing castellated teeth 48 and 49 on the opposed faces of the gears 41 and 42 respectively serve as a means for positively locking the split halves of the drive shaft 3 into direct engagement.

The operation of the above described device is as follows: Assuming the driven shaft 3 to be at rest or subjected to a torque resistance and power applied to the drive shaft 2, it will be seen that the latter shaft will be rotated in the direction of the arrow in Fig. 1, carrying with it the gear 4. The gear 4 will tend to turn the planet gear 5 in the opposite direction. The movement transferred to the gear 5 continues through the planet gear 7 to the driven gear 8. Resistance being offered to the movement of the driven gear 8, there will be a tendency for the gear train housing 33 to rotate in a direction opposite to that of the drive shaft 2 or in a direction as indicated by the arrow in Fig. 2. However, at this point the pins 37 will engage in the wedge shaped channels 38 and prevent further rotational movement of the gear housing 33 in such direction. It then becomes necessary for power to be transmitted through the gear train A and thereby to undergo a gear reduction to the shaft 9. The shaft 9 then transmits the power delivered through the reduction gear A to the gear 11 of the gear train B. At this point the power will then undergo a similar gear reduction and will finally be delivered to the driven shaft 3.

Although only two reducing gear trains A and B have been herein shown and described, it is obvious that they might readily be increased in number in order to obtain a greater gear reduction ratio, dependent upon the particular requirements of the installation. It should also be obvious that the drive gear 8 could equally well be made in the form of an internal toothed gear in order to obtain a greater gear reduction per gear unit.

To continue with the description of the mode of operation of the device,—after the power has been delivered through the reduction gears to the driven shaft 3 and the torque resistance of the latter has been overcome, the velocity of the drive shaft 2 may then be increased, at which point the governors 19 and 20 on the gear train A will overcome the resistance of the tension spring 23 and move further away from the axis of the drive shaft 2. As the governors tend to move away from the axis of the drive shaft 2, their cam surfaces 24 and 25 will bear against the flat plate 26 and tend to produce a binding or braking action upon the wheels 29 and 30. In this manner it will be seen that a retarding force is imposed upon the rotation of the planet gears 5 and 7. Such retarding force will then be transmitted to the gear housing 33 and the latter will start to move from its locked position and rotate in the same direction as that of the drive shaft 2. When the velocity of the drive shaft 2 becomes greater and the governors 19 and 20 are forced further apart, the brake wheels 29 and 30 will gradually become locked and of course the planet gears 5 and 7 will also assume a locked position, at which point the entire gear train A is locked out and the shaft 9 will be driven at the same speed as the drive shaft 2. The same mode of operation applies to the gear train B, with the exception that the tension spring 23', having a greater tensional force than that of the spring 23, will not permit the governors on the gear train B to attain their gear locking positions until a still greater velocity has been reached, or, in other words, until additional torque resistance upon the drive shaft 3 has been overcome. It will thus be seen that the cumulative gear reduction ratio between the drive shaft 2 and driven shaft 3 undergoes a constant and uniform decrease as the velocity of the drive shaft 2 is increased and the torque resistance of the driven shaft 3 is gradually overcome. The rate of change of the torque transmission is therefore constant since the gears are always in mesh and there is no selective gear change.

Fig. 6 offers a diagrammatic illustration of this mode of operation. The full line represents the power input which is delivered to the drive shaft 2. The dot and dash line, which represents the rate of change of the torque delivered through the automatic reduction gear, is a straight line. This is to be contrasted with the dotted line which represents the rate of change of the torque in the ordinary change gear or selective transmission in which the torque and consequently the rate of change of the torque descends to zero value each time that the gear ratio is changed.

The resultant advantage of a smooth constant flow of power is obvious.

The effect of torque resistance also calls for a proportionate directly increasing gear reduction. This latter statement may be illustrated by assuming that if an increased load were placed upon the driven shaft 3, then the speed of the latter would be reduced, and the governors on the gear train B would then move closer together and release the braking effect upon the planet gears in such gear train. The planet gears 12 and 14 then being free to rotate would transmit power from the shaft 9 through the gear train B and at a gradually increasing gear reduction. Further increase in the torque resistance will accordingly permit the gears of gear train A to become unlocked and produce a greater gear reduction ratio. This directly proportionate ratio of the increase in gear reduction relative to the torque resistance is diagrammatically illustrated in Fig. 7.

Means have also been provided for adjustably regulating the tension on the springs 23 and 23' which control the action of the governors. Referring particularly to Fig. 3, such means consist of a pair of tension springs 50 and 51 which are attached on each end to the governors and join at the point 52 on the sliding sleeve 53. The sleeve 53 is mounted upon the drive shaft 2 and carries the channel 54 in which the ends of a fork 55 engage. The upper end of the fork 55 is pivotally fixed at the point 56. A lever arm 57 connects to the fork at the point 56 and may be actuated by any suitable control means such as the wedge block 58 which is attached to the movable bar 59. The flexible cable 60 may then lead to any remote point of control such as a lever on the dash or steering post of an automobile.

It will thus be seen that relative longitudinal movement of the sleeve 53 with respect to the shaft 2 will serve as a means for adjustably regulating the tension of the springs 50 and 51 which determine the extent of outward movement of the governors 19 and 20. In this manner the velocity at which the governors move apart to retard the rotation of the planet gears may be adjustably regulated according to varying conditions. For example, if my reduction gear device were installed upon an automotive vehicle and if it were desired to substantially decrease the velocity range of gear reduction, such as when the automobile were driven over flat roads, the tension of the springs 50 and 51 would be decreased; if, however, the automobile were used in a hilly country and it was accordingly desired to increase the velocity at which a gear reduction would still be in effect, the tension of the springs 50 and 51 would be increased.

Means have also been provided, as illustrated in Figs. 4 and 5, for retarding or braking the rotation of the gear train housings. Such means consists of a lateral projecting flange or brake drum 61 on the side of the gear housing 33. A brake band 62, having a friction lining 63, encircles the brake drum 61. One end 64 of the brake band is secured to the arm 65 pivoted at the point 66 in the side of the main housing 1. Another arm 67 extends from the pivot point 66 and bears against the end of an adjusting screw 68. By means of adjustment of the position of the screw 68, it will be seen that the brake band 62 may be tightened or loosened as may be desired. The other end 69 of the brake band is connected to one end of the link arm 70. The other end of the link arm 70 is secured to a rock shaft 71. Further operating connecting means may be attached to the rock shaft 71 in order to apply or release pressure upon the brake band. Such operating means, however, have not been shown inasmuch as such expedients are well known to those skilled in the art.

The above described braking means is of particular advantage when the direction of power flow through the device is reversed. That is to say, when the torque on the driven shaft is greater than that of the drive shaft or, more specifically, in the case of an automotive vehicle installation, when such vehicle is traveling downgrade and it is desired to impart a braking effect to the propeller shaft. By means of retarding the rotation of the gear train housing 33 of either or both of the gear trains A and B, rather than allowing them to rotate freely, it will be seen that the power, which is transmitted from the driven shaft 3 to the drive shaft 2, will be forced to be transmitted through the gear trains instead of being directly transmitted to the drive shaft, as would be the case if the housings were permitted to rotate freely.

It should also be noted that the amount of braking pressure or force which is exerted upon the plates 26 and the brake drums 29 and 30, in order to decrease the gear reduction ratio, is relatively small. The force which it is necessary for this braking pressure to overcome is merely the differential between the power applied to the planet gear 5 and the oppositely applied resistance against the planet gear 7. Therefore, the braking power merely amounts to the difference between these two forces and for all practical purposes the loss of power which is detracted for such braking purpose is negligible.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In an automatic reduction gear, the combination of a drive shaft, a driven shaft, an epicyclic reduction gear train connecting said shafts, planet gears in said gear train, braking means for retarding the rate of axial rotation of said planet gears, a governor mounted on said drive shaft and adapted to actuate said braking means, rotatable axial supporting means for said planet gears, and means for locking said supporting means against rotation in one direction only.

2. In an automatic reduction gear, the combination of a drive shaft, a driven shaft, a series of epicyclic gear trains connected one to the other and between said drive and driven shafts, planet gears in each of said gear trains, velocity responsive means mounted on the drive end of each of said gear trains for retarding the axial rate of rotation of said planet gears in each respective gear train, rotatable axial supporting means for said planet gears, and means for locking said supporting means against rotation in one direction only.

3. In an automatic reduction gear, the combination of a drive shaft, a driven shaft, a series of epicyclic gear trains connected one to the other and between said drive and driven shafts, planet gears in each of said gear trains, velocity responsive means mounted on the drive end of each of said gear trains for retarding the axial rate of rotation of said planet gears in each respective gear train, rotatable axial supporting means for said planet gears, and braking means for retarding the rotation of said supporting means.

4. In an automatic reduction gear, the combination of a drive shaft, a driven shaft, a series of epicyclic gear trains connected one to the other and between said drive and driven shafts, planet gears in each of said gear trains, braking means for retarding the rate of axial rotation of said planet gears, governors mounted on the drive end of each of said gear trains, said governors being adapted to actuate each of said respecve braking means, rotatable axial supporting means for said planet gears, and means for locking each of said supporting means against rotation in one direction only.

5. In an automatic reduction gear, the combination of a drive shaft, a driven shaft, gears carried by each of said shafts, epicyclc shafts and gears rotatable about and connecting said first-named gears, and means controlled by the velocity of said drive shaft and independent of said first named gears for braking the axial rotation of said epicyclic shafts and gears.

6. In an autmatic reduction gear, the combination of a drive shaft, a driven shaft, gears carried by each of said shafts, epicyclic shafts and gears rotatable about and connecting said first-named gears, and velocity responsive means carried by said drive shaft and independent of said first named gears for braking the axial rotation of said planetary shafts.

7. In an automatic reduction gear, the combination of a drive shaft, a driven shaft, gears carried by each of said shafts, epicyclic shafts and gears rotatable about and connecting said first-named gears, brake wheels on said epicyclic shafts, a member adapted to frictionally engage said brake wheels, and velocity responsive means carried by said drive shaft and adapted to actuate said member.

8. In an automatic reduction gear, the combination of a drive shaft, a driven shaft, gears carried by each of said shafts, epicyclic shafts and gears rotatable about and connecting said first-named gears, brake wheels on said epicyclic shafts, a plate member surrounding said brake wheels and having recesses therein the inner walls of which are adapted to engage with the periphery of said brake wheels, centrifugally movable weights pivotally mounted on said drive shaft, and cam surfaces connected to said weights and adapted to bear against said plate member.

9. In an automatic reduction gear, the combination of a drive shaft, a driven shaft, an epicyclic reduction gear train connecting said shafts, a drive gear, a driven gear and connecting planet gears in said gear train, and velocity responsive means mounted on said drive shaft and independent of said drive and driven gears for directly retarding the rate of axial rotation of said planet gears.

10. In an automatic reduction gear, the combination of a drive shaft, a driven shaft, an epicyclic reduction gear train connecting said shafts, a drive gear, a driven gear and connecting planet gears in said gear train, braking means independent of said drive and driven gears for directly retarding the rate of axial rotation of said planet gears, and a governor mounted on said drive shaft and adapted to actuate said braking means.

11. In an automatic reduction gear, the combination of a drive shaft, a driven shaft, an epicyclic reduction gear train connecting said shafts, a drive gear, a driven gear and connecting planet gears in said gear train, braking means independent of said drive and driven gears for directly retarding the rate of axial rotation of said planet gears, a governor mounted on said drive shaft and adapted to actuate said braking means, and means for adjustably regulating the centrifugal movement of said governor.

12. In an automatic reduction gear, the combination of a drive shaft, a driven shaft, an epicyclic reduction gear train connecting said shafts, a drive gear, a driven gear and connecting planet gears in said gear train, velocity responsive means mounted on said drive shaft and independent of said drive and driven gears, for directly retarding the rate of axial rotation of said planet gears, rotatable axial supporting means for said planet gears, and means for locking said supporting means against rotation in one direction only.

13. In an automatic reduction gear, the combination of a drive shaft, a driven shaft, an epicyclic reduction gear train connecting said shafts, a drive gear, a driven gears and connecting planet gears in said gear train, velocity responsive means mounted on said drive shaft and independent of said drive and driven gears, for directly retarding the rate of axial rotation of said planet gears, rotatable axial supporting means for said planet gears, and braking means for retarding the rotation of said supporting means.

14. In an automatic reduction gear, the combination of a drive shaft, a driven shaft, a series of epicyclic gear trains connected one to the other and between said drive and driven shafts, a drive gear, a driven gear and connecting planet gears in each of said gear trains, and velocity responsive means mounted on the drive end of each of said gear trains and independent of said drive and driven gears, for directly retarding the axial rate of rotation of said planet gears in each respective gear train.

THOMAS F. RAINSFORD.